(12) United States Patent
Shindin et al.

(10) Patent No.: US 11,678,403 B2
(45) Date of Patent: Jun. 13, 2023

(54) MANAGING CONTROL POLICIES OF A DISTRIBUTION SYSTEM

(71) Applicant: International Business Machines Corporation, Armonk, NY (US)

(72) Inventors: Evgeny Shindin, Nesher (IL); Harold Jeffrey Ship, Mitzpe Netofa (IL); Odellia Boni, Giva'at Ela (IL)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/181,698

(22) Filed: Feb. 22, 2021

(65) Prior Publication Data
US 2022/0272677 A1 Aug. 25, 2022

(51) Int. Cl.
*H04W 84/12* (2009.01)
*H04L 41/0803* (2022.01)
*H04L 41/0894* (2022.01)

(52) U.S. Cl.
CPC ......... *H04W 84/12* (2013.01); *H04L 41/0803* (2013.01); *H04L 41/0894* (2022.05)

(58) Field of Classification Search
CPC ....................... H04L 41/0803; H04L 41/0894
See application file for complete search history.

(56) References Cited

U.S. PATENT DOCUMENTS

| | | |
|---|---|---|
| 5,657,450 A | 8/1997 | Rao |
| 6,442,139 B1 | 8/2002 | Hosein |
| 6,999,432 B2 | 2/2006 | Zhang |
| 10,378,940 B2 | 8/2019 | Leaders |
| 10,738,548 B2 | 8/2020 | Xue |
| 2007/0150559 A1* | 6/2007 | Smith ..................... G06F 21/85 709/220 |
| 2008/0228755 A1* | 9/2008 | Haga ................... G06F 11/3433 707/999.005 |

(Continued)

OTHER PUBLICATIONS

Miaqsood et al., "A Two-Stage Interval-Stochastic Programming Model for Waste Management under Uncertainty", Technical Paper, Published online: Feb. 22, 2012, Journal of the Air & Waste Management Association, 53:5, 540-552, <https://www.tandfonline.com/doi/abs/10.1080/10473289.2003.10466195>.

(Continued)

*Primary Examiner* — Mohammad S Anwar
(74) *Attorney, Agent, or Firm* — Brian M. Restauro; Daniel R. Simek; Edward J Wixted, III (57) ABSTRACT

Aspects of the present invention disclose a method for managing the control policies associated with processing of a set of resources by a distribution system. The method includes one or more computer processors determining information associated with a configuration of a distribution system. The method further includes determining information related to a set of resource to process utilizing the distribution system. The method further includes determining respective values for a plurality of parameters related to processing the set of resources utilizing the distribution system. The method further includes selecting an initial set of control policies; The method further includes updating the initial set of control policies. The method further includes instructing the distribution system to process the set of resources utilizing the updated set of control policies.

20 Claims, 4 Drawing Sheets

(56) References Cited

U.S. PATENT DOCUMENTS

2010/0094999 A1* 4/2010 Rama .................. G06F 9/4843
                                                        709/225

OTHER PUBLICATIONS

Bertsimas et al., "Robust Fluid Processing Networks", IEEE Transactions on Automatic Control, vol. 30, No. 3, Mar. 2015, 14 pps., <https://web.ma.utexas.edu/users/mcudina/CudRam11.pdf>.

Casale et al., "Robust workload estimation in queueing network performance models", Year: 2008, vol. 1, pp. 183-187, 6th Euromicro Conference on Parallel, Distributed and Network-Based Processing.

Cassandras et al., "Perturbation analysis and control of two-class stochastic fluid models for communication networks," in IEEE Transactions on Automatic Control, vol. 48, No. 5, pp. 770-782, May 2003, <https://ieeexplore.ieee.org/abstract/document/1198598/>.

Cudina et al., "Asymptotically Optimal Controls for Time-Inhomogeneous Networks", SIAM J. Control Optim. vol. 49, No. 2, pp. 611-645, Copyright 2011 Society for Industrial and Applied Mathematics, <https://web.ma.utexas.edu/users/mcudina/CudRam11.pdf>.

Dai et al., "Maximum pressure policies in stochastic processing networks", Operations Research, Published Online: Apr. 1, 2005, vol. 53, No. 2, pp. 197-218, <https://pubsonline.informs.org/doi/abs/10.1287/opre.1040.0170>.

Huang et al., "An inexact two-stage stochastic programming model for water resources management under uncertainty". Civil Engineering and Environmental Systems, 17:2, 95-118, 2000, <https://www.tandfonline.com/doi/abs/10.1080/02630250008970277>.

Mueen, "Estimating Server Utilization Rate in Single Server Queuing Models Using an Approximate Solution of Stiff Fluid Flow Model", Ain Shams Engineering Journal 11 (2020) 805-809, <https://www.sciencedirect.com/science/article/pii/S209044791930187X>.

Naoum-Sawaya et al., "A stochastic optimization model for real-time ambulance redeployment", Computers & Operations Research, vol. 40, Issue 8, 2013, pp. 1972-1978, <https://www.sciencedirect.com/science/article/piii/S0305054813000385>.

Stolyar, "Maximizing Queueing Network Utility Subject to Stability: Greedy Primal-Dual Algorithm", Queueing Systems, vol. 50, pp. 401-457 (2005), Published: Aug. 2005, <https://link.springer.com/article/10.1007/s11134-005-1450-0>.

* cited by examiner

MANAGING CONTROL POLICIES OF A DISTRIBUTION SYSTEM

BACKGROUND OF THE INVENTION

The present invention relates generally to the field of system controls, and more particularly to determining policies for controlling elements of the distribution system.

Distribution systems are utilized by various industries to transfer, distribute, and/or deliver resources from one or more supplying sources to a plurality of endpoints (e.g., users, equipment, facilities, etc.) or another distribution system, such as an intranet of a business. For example, a utility will utilize different control policies to supply water and electricity over different distribution systems. Whereas, a telecommunication company may transfer differing electronic or digital resources, such as voice, data, and streaming content via one distribution system, such as a network to process, transfer, and/or redistribute two or more differing resources from a plurality of sources to various customers (e.g., user) or other endpoints.

Control policies affect and govern various aspects of a distribution system. In some instances, a distribution system more granularly governs the processing of resources by utilizing sets of control policies that are respectively distributed among elements of the distribution system that process one or more resources and control the flow of resources among elements of the distribution system.

SUMMARY

Aspects of the present invention disclose a method, computer program product, and system for managing the control policies associated with processing of a set of resources by a distribution system. The method includes at least one computer processor determining information associated with a configuration of a distribution system. The method further includes at least one computer processor determining information related to a set of resource to process utilizing the distribution system. The method further includes at least one computer processor determining respective values for a plurality of parameters related to processing the set of resources utilizing the distribution system. The method further includes at least one computer processor selecting an initial set of control policies. The method further includes at least one computer processor updating the initial set of control policies. The method further includes at least one computer processor instructing the distribution system to process the set of resources utilizing the updated set of control policies.

DETAILED DESCRIPTION

Embodiments of the present invention recognize that optimizing the movement and output allocations of a resource via a distribution system, such as a network can be modelled as a Continuous Linear Programming (CLP) problem for a resource that is fluidic or can be treated like a fluid. In one example, the resource to distribute is water with the associated goals of ensuring a steady supply of water while minimizing the cost of the water over a period of time by reducing water loss. If a single reservoir that supplies a town and it is at capacity, then additional water received to the reservoir is released and lost. Alternatively, if the town is supplied by multiple reservoirs CLP modeling can find an optimal set of policies to extract water from among the reservoirs based on a recharge rate for each reservoir and modifying the flow through a distribution system with. In another example, telephone exchanges and computer terminals are linked via a data network with a goal of minimizing the total time spent by all the data within the network during a given period of time. Data entering various terminals is destined for other locations within the network or is relayed through the network to one or more endpoints or another network. Embodiments of the present invention recognize that optimization goal(s), constraints, and other parameter affect generating control policies for a distribution system.

Embodiments of the present invention recognize that CLP modeling can generate an optimal control policy (i.e., u(t)) for elements of a distribution system by determining various parameters, analyzing constrains and optimization goals, and solving a set of equations, such as:

$\min \int_0^T h^T x(t) dt$ such that $\int_0^t Gu(s)ds + x(t) = \alpha + at$;

$\max \int_0^T (T-t) c^T u(t)$ such that $\int_0^t Gu(s)ds + x(t) = \alpha + at$; and $Hu(t) \leq b; x(t), u(t) \geq 0; 0 \leq t \leq T$ generate the entries of matrices $G$ and $H$.

$$G = \begin{bmatrix} G_{k,j} = 1 & j = k \\ G_{k,j} = -p_{j,k} & j \neq k \end{bmatrix};$$

$$H = \begin{bmatrix} H_{i,j} = \tau_j & s(j) = i \\ H_{i,j} = 0 & s(j) \neq i \end{bmatrix}; \text{ and}$$

$b_i = 1 \forall i$

Where:

k=1, . . . , K number of buffers utilizes by a process element (PE), such as a server i=1, . . . , I number (ID) corresponding to utilized PE j=1, . . . , J number (ID) corresponding to flows. s(j)=i if $PE_i$ processes flow j, the quantity of flows are equal to quantity of buffers J=K, f(j)=k if flow j empties buffer k, and each flow j is further associated with a job class/priority value $\alpha_k$ initial amount of resource (e.g., data) stored within an instance of the buffer k $a_k$ exogeneous input rate to the buffer k (i.e., buffer ID or number)

$\mu_j$ a service rate of server i=s(j) per unit of flow j; $\tau_j = 1/\mu_j$ $p_{j,k}$ proportion of flow j that comes to buffer k after processing $h_k$ a cost for buffer k to hold/store a unit of resource However, embodiments of the present invention recognize that while a configuration and other factors associated with a distribution system can be determined, some variables (e.g., parameters) utilized to solve CLP problems and generate a set of optimized control policies for a distribution system are often uncertain (e.g., not exactly known) and change over time, such as $\mu_j$ (service rate per unit) or $\tau_j$ (processing times per unit), in addition to $a_k$ (input rates).

Embodiments of the present invention improve the CLP modeling for optimizing the control policies of a distribution system by better qualifying, bounding, and quantifying changeable parameters and variables. Embodiments of the present invention determine an initial set of control policies to apply within the distribution system and evolve the optimization of the control policies while the distribution system operates. Embodiments of the present invention are applicable to processing a set of resources through a distribution system where one or more resources of a set of resources are processed concurrently and can be received at differing rates via different inputs. Another embodiment of the present invention is applicable to processing a single resource where the resource can be treated as a set of resources by allocating the resource among classes/priorities based on output dictates (e.g., consumer demand for the resource).

Embodiments of the present invention utilize various methods to monitor and dynamically re-optimize the set of control policies applied among elements of a distribution system process while processing a set of resources. Embodiments of the present invention dynamically re-optimize control policies by determining respective values for known variables/parameters; identifying an uncertainty set of values related to other changeable parameters and/or variables (e.g., time-varying values, a dependent variable, range bounded, unknown at start-up (i.e., T=0), etc.) of one or more resources and/or aspects of a distribution system; and approximate determine approximations of continuous functions respectively associated with one or more changeable variables utilizing various techniques, such as splines.

The descriptions of the various scenarios, instances, and examples related to the present invention have been presented for purposes of illustration but are not intended to be exhaustive or limited to the embodiments disclosed. As described herein, aspects of the present invention are discussed with respect to data and a network for the purpose of explaining embodiments of the present invention and are not to be construed as a limiting example. Various embodiments of the present invention are applicable to other types of distribution systems and associated resources, where the movement or transfer of a resource behaves as a fluid or can be approximated as a fluid. Examples of other distribution systems and associated resources include but are not limited to a telecommunication system, an electrical transmission grid, a waste treatment system, a water supply system, and a logistical/supply chain operation.

Figure 1:
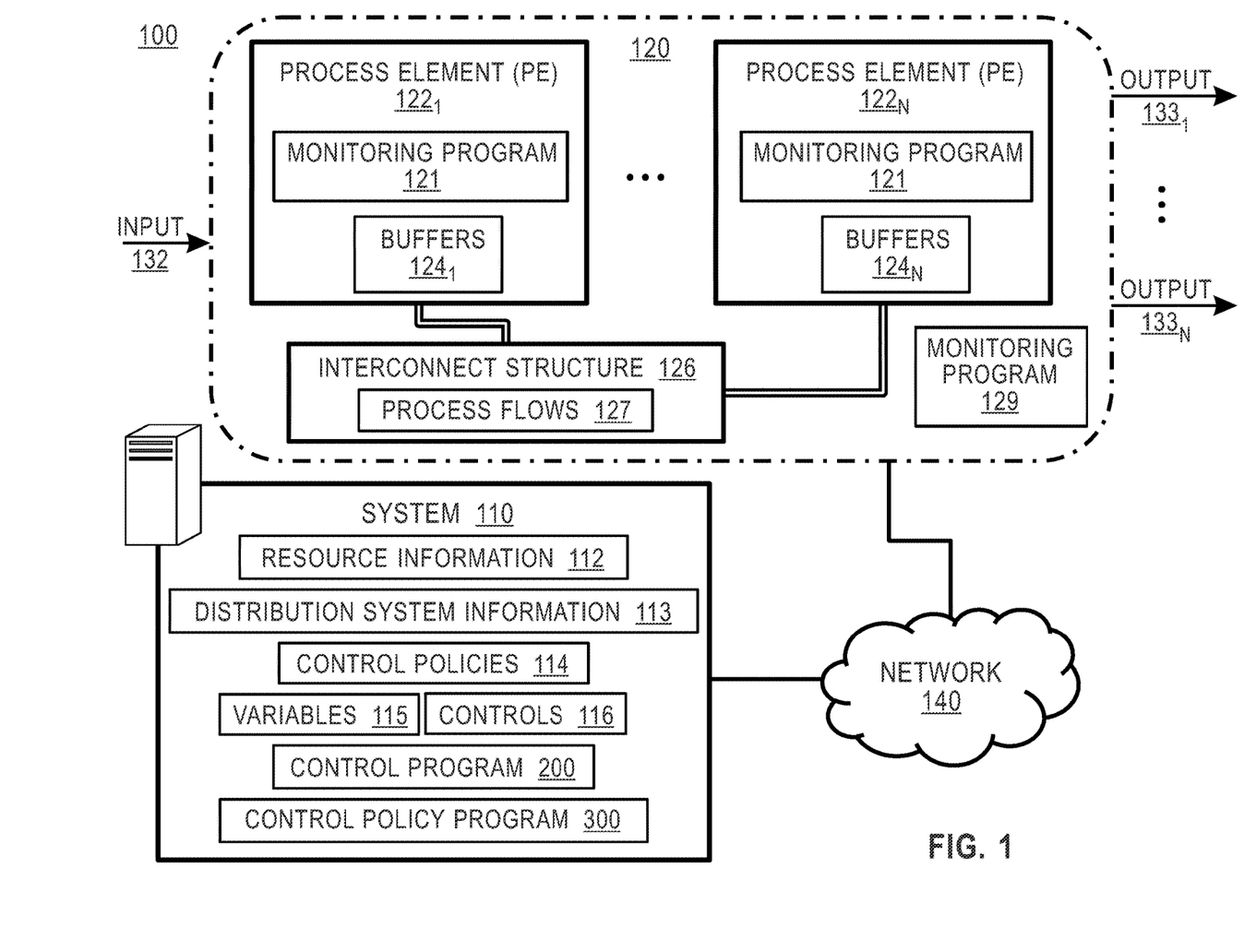
FIG. 1 is a functional block diagram of a portion of a network environment, in accordance with an embodiment of the present invention.

The present invention will now be described in detail with reference to the Figures. FIG. 1 is a functional block diagram illustrating environment 100, in accordance with embodiments of the present invention. In an embodiment, environment 100 includes system 110, distribution system 120, input 132, output $133_1$ through output $133_N$, and network 140. In one embodiment, system 110 and distribution system 120 are interconnected over network 140. Environment 100 may include a plurality of instances of input 132 respectively associated with a resource.

System 110 may be a laptop computer, a tablet computer, a netbook computer, a personal computer (PC), a desktop computer, a personal digital assistant (PDA), a smart phone, a wearable device (e.g., smart glasses, a smart watch, etc.,), or any programmable computer system known in the art. In certain embodiments, system 110 represents a computer system utilizing clustered computers and components (e.g., database server computers, application server computers, etc.) that act as a single pool of seamless resources when accessed through network 140, as is common in data centers and with cloud-computing applications. In general, system 110 is representative of any programmable electronic device or combination of programmable electronic devices capable of executing machine-readable program instructions and communicating with distribution system 120 and/or elements of distribution system 120 via network 140. System 110 may include components, as depicted and described in further detail with respect to FIG. 4, in accordance with embodiments of the present invention.

In certain embodiments, distribution system 120 and one or more of PE $122_1$ through PE $122_N$ represent computer systems utilizing clustered computers and components (e.g., database server computers, application server computers, etc.) that act as a single pool of seamless resources when accessed through interconnect structure 126 (e.g., a computer network), as is common in data centers and with cloud-computing applications. In some embodiments, distribution system 120, PE $122_1$ through PE $122_N$, and interconnect structure 126 are representative of any programmable electronic device or combination of programmable electronic devices capable of executing machine-readable program instructions and communicating with system 110 and via network 140. Various elements of distribution system 120, such as PE $122_1$ through PE $122_N$, and interconnect structure 126 may also include components, as depicted and described in further detail with respect to FIG. 4, in accordance with embodiments of the present invention.

System 110 includes resource information 112, distribution system information 113, control policies 114, variables 115, controls 116, control program 200, and control policy program 300. System 110 may also include various programs and data (not shown), such as a web interface; a graphical user interface (GUI); application program interfaces (APIs); a suite of functions and/or programs that perform various mathematical, statistical, conversions, and other algorithmic determinations; etc. In one embodiment, system 110 is representative of one or more computing systems within a cloud computing system. In another embodiment, system 110 is representative of one or more computing system of an organization, such as a business, a university, an enterprise, etc.

Resource information 112 includes information associated with one or more resources (not shown) that are received for redistribution (e.g., processing) by distribution system 120. In an embodiment, system 110 receives, via network 140, information to include within resource information 112 from one or more entities (not shown) external to environment 100, such as a user, sources that generate a resource, etc. Resource information 112 may include optimizations goals and/or constraints respectively associated with a resource or a set of resources, such as costs, a processing duration for distribution system 120, latency targets, respective class (e.g., job call)/priority values, etc.; the number of instances of inputs 132 that receive a respective resource; information associated disturbing a resource among outputs $133_1$ through $133_N$ assigned to one or more respective destinations (e.g., endpoints, customers, other distribution systems, etc.), such as one or more rates of supply corresponding to a resource (e.g., a minimum rate, a maximum rate, a range of rates, etc.), class/priority value assignments or allocations respectively associated with a resource of a set of resources, latency targets, etc.

In some embodiments, resource information 112 also includes historical information and data from prior distributions of resources by distribution system 120; sets of control policies applied to distribution system 120 related to prior instances of processing resources; projections for a supply of a resource to a respective instance of input 132, such as a range of supply rates, an average supply rate, statistical information related to changes to a rate of supply of a resource, etc.

Distribution system information 113 includes a plurality of information associated with distribution system 120, and elements and sub-elements included within distribution system 120, such as a quantity of active PEs within distribution system 120 to process resources; an ID corresponding to each active PE (i.e., 122$_i$); a number (i.e., quantity) of buffers included within each active PE; respective ID's of buffers of a PE (e.g., buffer 124$_{1,1}$ . . . buffer 124$_{1,5}$ (not shown) of PE 122$_1$); a quantity of flows (i.e., 1 . . . J) into a give PE; a maximum service rate that a PE can execute for a given class/priority value; a configuration of interconnect structure 126; information related to interconnect structure 126, such as an ID and a flow direction corresponding to each flow of process flows 127; a quantity of outputs 133$_1$ through 133$_N$ that receive an allocation (e.g., quantity or percentage) of a given resource of the set of resources, etc.

In one embodiment, information within distribution system information 113 is updated by a system management facility (not shown) and/or monitoring program 129 on a periodic basis and/or in response to detecting a change to an element or a configuration associated with distribution system 120. Changes to an element or configuration associated with distribution system 120 may include determining that one or more PE 122's are off-line, changes within interconnect structure 126 that affect flows 127 among one or more PEs of PE 122$_1$ through PE 122$_N$, configuration changes, loss of an output 133, determining that one or more buffers are at capacity or within a threshold percentage of capacity, etc.

In various embodiments, state data, control values, variables, and/or other parameters related to a current utilization of distribution system 120 for processing a set of resources are also stored among variables 115 and controls 116. Some information within distribution system information 113 may be interrelated and associated with a resource, such as one or more flow IDs, ID's of utilized PEs, a service rate for a respective PE, and a class/priority value assigned to a resource. In some embodiments, distribution system information 113 also stores historic information associated with prior utilizations of distribution system 120 to process a set of resources, such as configuration data; initial state data values, variable values, control values, etc.; subsequent changes to one or more aforementioned values; etc.

Control policies 114 includes sets of control policies applied among elements of distribution system 120. A set of control policies can include groups of instructions that direct how respective elements of distribution system 120 processes one or more resources among active or utilized PE of PE 122$_1$ through PE 122$_N$. Control policies 114 also include a plurality of current and previous control policies for processing individual resources or sets of resources utilizing distribution system 120. In one embodiment, control values for control policies are stored within controls 116. A control policy may also include instructions related to allocating the processing capacity of a PE among the buffer 124's of the PE based on class/priority values assigned to a resource of a set of resources and the maximum service rate for a given class/priority value, controlling (e.g., throttling) the rates of flow into and out of each utilized buffer within a PE, etc.

In various embodiments, control policies 114 also includes rules related to processing a set of resources utilizing distribution system 120. In one scenario, control policies 114 include rules and threshold values for determining a method to utilize to identify or generate an initial set of control policies based on a level of optimization and a degree of uncertainty among parameters associated processing a set of resources based on given state of distribution system 120. In some scenarios, control policies 114 also includes rules that dictate one or more monitoring intervals or a frequency of monitoring for a resource of a set of resources, or another monitoring interval dictate based on an uncertainty values corresponding to the resource. For example, if control program 200 determines that an uncertainty value related to one or more variables of a resource is above a threshold value, then control program 200 utilizes a shorter temporal intervals for monitoring the resource. In some embodiments, control policies 114 enables each resource of a set of resources to utilize differing monitoring interval values.

In other scenarios, control policies 114 also includes rules that affect monitoring intervals and/or analysis intervals based on determining a change to an approximation of a continuous function for a variable changes. For example, if control program 200 determines that an approximation of a continuous function for a variable changes less than a threshold amount or converges to a continuous function, then control program 200 utilizes a longer temporal interval for monitoring the resource. In other embodiments, control policies 114 also includes logical controls for utilizing or releasing additional PEs based on changes to the input rate of a resource to distribution system 120 an information associated with the active PEs of distribution system 120, rules related to interconnect structure 126 routing (e.g., allocating) a resource received via one or more instances of input 132 among one or more PEs of PE 122$_1$ through PE 122$_N$, etc.

Variables 115 includes state variables and parameters associated with elements of distribution system 120. For example, state variables and parameters may include a quantity of a resource within a given buffer of a PE, a maximum service rate of a PE, an initial/residual quantity of resource stored within a buffer of a PE, etc. In various embodiments, variables 115 also store the approximated continuous functions and respective calculated values associated with changeable (e.g., time-variate) variables corresponding to a resource of the received set of resources and/or other aspects of distribution system 120. For example, variables 115 includes the values associated with an uncertainty set of values respectively associated with a resource of a set of resources, such as a nominal service rate, an uncertainty budget, a service rate perturbation value, etc.; actual input rates of a given resource among instances of input 132; a respective exogeneous input rate of a resource into a given buffer (i.e., $a_k$); etc.

Controls 116 includes one or more control parameters respectively associated with one or more elements of distribution system 120, such as a time percentage allocated to process each class/priority value respectively associated with a resource received to a PE; threshold values related to elements of distribution system 120, such as a threshold value that triggers a warning indicating that a buffer of a PE is nearing storage capacity limit for a resource; trigger values related to utilizing or activating additional PEs based on an increased rate of input of one or more resources (e.g., distribution system 120 is service rate limited and cannot achieve a dictated goal) and/or other factors; trigger values to releasing or deactivating PEs based on a decreased rate of input of one or more resources to distribution system 120; etc.

In some embodiments, controls 116 also include temporal interval values or durations values utilized by control program 200, monitoring intervals utilized by instance of monitoring program 121 and/or monitoring program 129 to determine information associated with distribution system 120, such as a demand dictate associated with an endpoint (not shown) for a given resource, or a maximum duration (M) for processing a set of resource by distribution system 120. In various embodiments, values corresponding to one or more control parameters within controls 116 is updated by control policy program 300 to optimize various control policies 114 while processing a set of resources input to distribution system 120.

Figure 2:
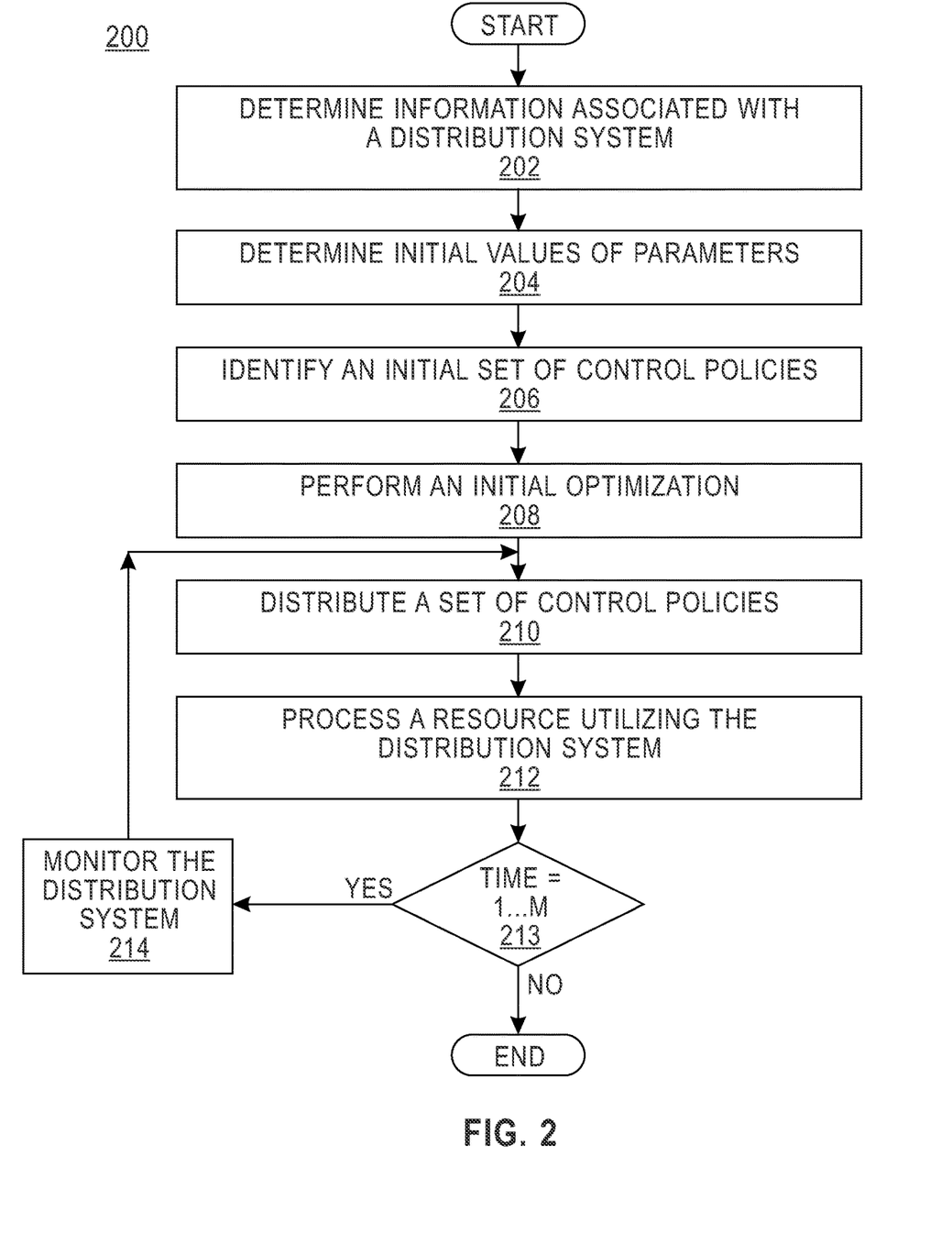
FIG. 2 is a flowchart depicting operational steps of a control program, in accordance with an embodiment of the present invention.

Control program 200 selects or generates a set of control policies, and applies (e.g., implements) a set of control policies among elements of distribution system 120 in response to receiving a set of resources to redistribute among two or more of output $133_1$ through output $133_N$. In an embodiment, control program 200 generates and applies a set of control policies among a plurality of active process elements (i.e., PE $122_1$ through PE $122_N$) of distribution system 120 based on information associated with distribution system 120 and information respectively associated with a resource of a set of resources processed by distribution system 120. In some embodiments, control program 200 can also generate control policies that affect interconnect structure 126, such as dynamically rerouting (e.g., reassigning) flows among PEs.

Figure 3:
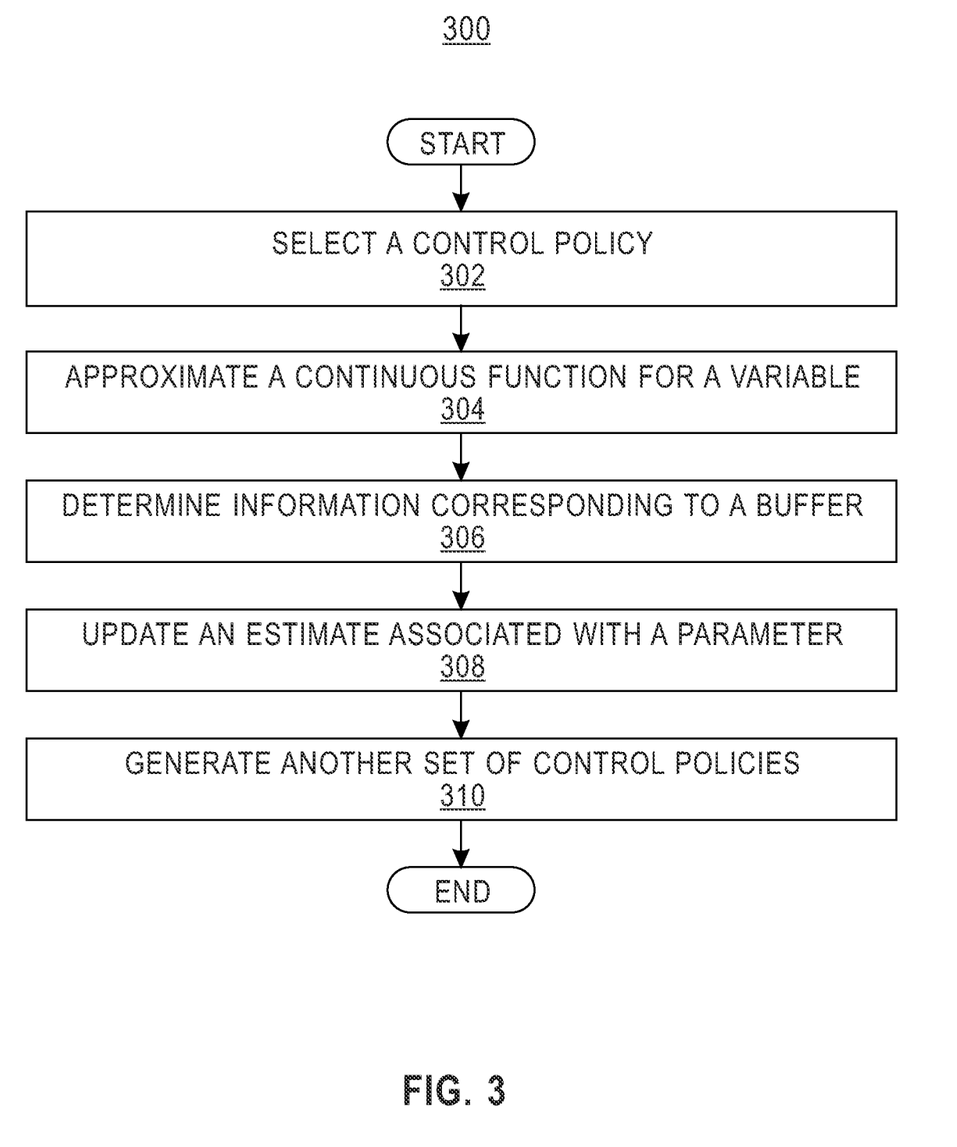
FIG. 3 is a flowchart depicting operational steps of a control policy program, in accordance with an embodiment of the present invention.

In various embodiments, control program 200 utilizes various monitoring and sampling techniques to identify changes to the rates that one or more resources are input (i.e., received) to distribution system 120 as a function of time. In addition, control program 200 interfaces with control policy program 300 to evolve and/or improve the optimization of control policies utilized by distribution system 120 to process a set of resources.

Control policy program 300 is a program that improves the optimization of distribution system 120 to process a set of resources by periodically updating the control policies utilized by distribution system 120 while processing a set of resources. In various embodiments, control policy program 300 improves the optimization of a set of control policies by analyzing snapshots (i.e., discrete observations) of monitoring data for uncertain or changeable variables and approximating a continuous function to describe each changeable variable. Control policy program 300 utilizes an approximation of a continuous function of associated with an uncertain or changeable variable to predict subsequent values associated with the variable for a giving point in time, and to update or generate another set of control policies and/or control values utilized by distribution system 120 to process a set of resources. By utilizing an approximation of a continuous function for a variable, control policy program can generate an updated set of control policies more frequently (i.e., at smaller temporal intervals) than the temporal intervals utilized by control program 200 to monitor distribution system 120.

In an embodiment, distribution system 120 includes a plurality of process elements (PEs), such as PE $122_1$ through PE $122_N$; interconnect structure 126; monitoring program 129; and other hardware, software, and data (not shown). Examples of other hardware, software, and data (not shown) may include one or more computer systems that control aspects of distribution system 120 and/or included elements, such as a management system; a computing system that hosts monitoring program 129; an internal communication network, such as a local area network (LAN); one or more routers; cabling; a system management facility (SMF); communication programs; information related to suppliers of a resource, recipients of one or more resources, or allocations of one or more resources; etc. Other features of distribution system include one or more instances of input 132 and outputs $133_1$ through $133_N$.

In an example embodiment, PE $122_1$ through PE $122_N$ represent servers and/or routers within distribution system 120. In an embodiment, each of PE $122_1$ through PE $122_N$ include one or more respective buffers $124_{i,k}$, such as buffer $124_{1,2}$ of PE $122_1$ (not shown). In some embodiments, a PE is assigned a number of different resources less than or equal to the quantities of buffer 124 included within the PE. A resource received to a PE is stored among one or more buffer $124_i$'s included within a PE. In one embodiment, PE $122_1$ through PE $122_N$ represent the active PEs of distribution system 120. Some PEs of PE $122_1$ through PE $122_N$ receive resources via one or more respective instances of input 132 and interconnect structure 126. Other PEs of PE $122_1$ through PE $122_N$ and interconnect structure 126 are utilized to internally process and redistribute the set of resources input to distribution system 120. Subsequently, one or more other PEs of PE $122_1$ through PE $122_N$ output the received resource among output $133_1$ through output $133_N$.

In various embodiments, PE $122_1$ through PE $122_N$ further include an instance of monitoring program 121; an interface between a respective instance of buffers $124_{i,k}$ (not shown) and interconnect structure 126; hardware and/or measurement features (not shown) that determine information for a monitoring program, such as monitoring program 121; and other programs and data (not shown). Examples of other programs and data (not shown) may include a communication program; a processing program that executes instructions of a respective control policy received from system 110; data generated by an included instance of monitoring program 121; configuration data associated with a PE, such as a quantity buffers 124 within the PE and a storage capacity corresponding to each instance of buffer 124 within the PE, an ID assigned to an instance of buffers 124, an ID of an input resource flow, and ID of an output flow of a resource; state data, such as a maximum total service rate for a PE, a service rate associated with a class/priority value, an initial quantity of resource within an instance of buffer 124, a current quantity of resource within a given instance of buffer 124 included in the PE; etc.

In an embodiment, monitoring program 121 determines information and state data (e.g., observations) associated with a respective PE $122_1$ (not shown), such a service or processing rate of a resource corresponding to a PE and a class (i.e., $\mu_j$), a set of rates corresponding to each flow into and out of a respective buffers $124_{i,k}$, a current quantity of a resource (i.e., $x_k$), stored within a respective buffers $124_{i,k}$ of PE 1220. In various embodiments, monitoring program 121 is invoked by control program 200 and/or control policy program 300. In some embodiments, monitoring program 121 represents a local instance of monitoring program 129 that executes within a PE. In other embodiments, monitoring program 121 represents a monitoring program different from monitoring program 129.

Interconnect structure 126 is representative of a set connections and other hardware that performs various action within distribution system 120, such as receiving a set of resources into distribution system 120 via instances of input 132, transferring portions of the set of resources among the active PEs of distribution system 120, and outputting the redistributed the received set of resources among two or more of output 133$_1$ through output 133$_N$. In an example embodiment, interconnect structure 126 represents a plurality of cables and routers that receive data into distribution system 120 and one or more PEs, interlink PE 122$_1$ through PE 122$_N$ and respective buffers 124$_{i,k}$, and transfer the redistributed data among output 133$_1$ through output 133$_N$ respectively associated a plurality of destinations (not shown).

In various embodiments, flows 127 represent a plurality of transfer paths for the set of resource among elements or features include within distribution system 120. Each flow of flows 127 may be further associated with an identifier (i.e., a flow ID), a processed resource, a flow direction, a maximum flow capacity, and flow rate. A flow rate associated with a given flow and resource may be directly measured by monitoring program 129 or estimated based on a service rate of a PE and a related class/priority value corresponding to (e.g., assigned) a given resource.

In an embodiment, monitoring program 129 is a feature included within an SFM (not shown) associated with distribution system 120. Monitoring program 129 can determine information and data related to various aspects of distribution system 120, such as an input rate of a resource respectively associated with an instance of input 132, an output rate of a resource respectively associated with one or more of output 133$_1$ through output 133$_N$. In various embodiments, monitoring program 129 determines at least the rate transfer of a resource for each flow of flows 127 among the utilized PEs of distribution system 120.

Input 132 represents the flow of a resource into distribution system 120. A plurality of instance of input 132 are utilized to receive a set of resources into distribution system 120. In one embodiment, input 132 represents the flow of a resource from source that produces the resource, such as data from a computer system of a user (not shown). In some embodiments, two or more instance of input 132 receive a portion of a given resource. In another embodiment, input 132 represents the flow of a resource from an upstream instance of distribution system 120, such as a transfer of data from an intranet to local area network within an enterprise.

Output 133$_1$ through output 133$_N$ represent a redistribution of a set of resources exiting distribution system 120 and allocated among two or more respective destinations or consumers of a resource, such as endpoints, user devices, and/or other distribution systems.

Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 110 and distribution system 120, in accordance with embodiments of the present invention. In various embodiments, network 140 operates locally via wired, wireless, or optical connections and can be any combination of connections and protocols (e.g., personal area network (PAN), Bluetooth®, near field communication (NFC), laser, infrared, ultrasonic, etc.). In some embodiments, network 140 also links system 110 to various elements included within distribution system 120, such as process elements (PEs) 122$_1$ through 122$_N$, interconnect structure 126, and/or a system (not shown) that hosts monitoring program 129.

FIG. 2 is a flowchart depicting the operational steps of control program 200, a program that generates and applies (e.g., implements) a set of control policies among elements of distribution system 120 that receive and redistribute a set of resources, in accordance with embodiments of the present invention. In an embodiment, control program 200 executes control policy program 300 to dynamically improve the optimization of the control policies utilized by distribution system 120 based on monitoring distribution system 120 processing a set of resources. In various embodiments, control program 200 also directs the processing of a set of resources by distribution system 120.

In step 202 control program 200 determines information associated with a distribution system. In one embodiment, control program 200 determines information associated with distribution system 120 based on information stored within distribution system information 113. In another embodiment, control program 200 polls the plurality of elements of distribution system 120 and updates distribution system information 113 with information received from the plurality of elements of distribution system 120. In another embodiment, control program 200 interfaces with an SMF (not shown) of distribution system 120 to determine information associated with distribution system 120. Examples of information associated with distribution system 120 are discussed about with respect to distribution system information 113, such as a number of instances of buffers 124 within a respective PE available to process resources.

In a further embodiment, control program 200 utilizes the determined information related to distribution system 120 and a set of resources to process to determine run/use rules that can be described as elements included within an instance of matrix G (similar to but different from matrix G previously discussed above) and various factors and dictates, such as:

if G is a rectangular matrix of run/use rules, then s(j)=i if PE$_i$ (i.e., one of PE 122$_1$ through PE 122$_N$) processes flow j and for each buffer 124$_{i,k}$ exactly one flow j': f(j')=k is active/processed for a dictated time interval [0,T], every control policy n should empty exactly K buffers, the set of control policies of control policies 114 cover flows 1 through J, $$N \geq \max_k \|F_k = \{j : f(j) = k\}\|$$

indicates the quantity of different control policies utilized among the elements of distribution system 120, A duration to run different policies is divided to have equal numbers of observations (e.g., monitoring snapshots) of x$_k$(t$_m$), a$_k$(t$_l$) for each control policy, Define J$_1$, . . . , J$_N$, |J$_N$|=K as the subsets of columns of the matrix G under different control policies, and square matrices G$_1$, . . . , G$_N$ are obtained after removing columns having non-active resource flow;

alternatively, if G is a square matrix, then N=1, and G$_1$=G.

In step 204, control program 200 determines initial values of parameters. In an embodiment, control program 200 determines initial values of some parameters based on analyzing information within resource information 112 related to a set of resources to process. Control program 200 may receive initial values for one or more parameters or other information from one or more entities (not shown) external to environment 100, such as one or more optimization goals, a maximum input rate of a resource, class/ priority value dictates respectively associated with a request to process a set of resources utilizing distribution system 120, etc. Control program 200 can also determine values related to PE $122_1$ through PE $122_N$, such as nominal service rates, respective service rate deviations, and the uncertainty budget for the estimated one or more service rates for a respective PE. Control program 200 stores one or more determined initial values of parameters within variables 115.

In various embodiments, control program 200 determines that one or more parameters and corresponding values are further related to a class/priority value associated with (e.g., assigned to) processing a resource for a respective user/consumer. In one scenario, control program 200 determines that an initial value corresponding to one parameter is known and invariant (i.e., fixed), such as a maximum total service rate corresponding to a PE and a maximum capacity of a buffer of a PE. In another scenario, control program 200 determines an initial value corresponding to a parameter that is a variable but with known characteristics, such as an initial quantity of a resource stored within a respective buffer $124_k$ (i.e., $\alpha_k$) of a PE at time (T)=0, or actual input rates $a_k$ of a resource to a respective buffer $124_k$.

Still referring to step 204, in some embodiments, if control program 200 cannot directly determine an initial value corresponding to one or more other parameters, then control program 200 utilizes one or more estimation techniques to bound values related to an uncertain or changeable variable/parameter. Control program 200 can estimates an initial value corresponding to one of the other parameters from among a range of values or an uncertainty set based on other information, such as historic processing data, optimization goals, state data related to distribution system 120, etc. For example, control program 200 can determine an uncertainty set associated a service rate $\mu_j = \bar{\mu}_j - \tilde{\mu}_j \zeta_j(t)$; where:

$\zeta_j(t) \in [0; 1] \forall j$, is the uncertainty of service rate for the class/priority value of flow j $\Sigma_{j:s(j)=i} \zeta_j(t) \leq \Gamma_i$ is the uncertainty budget for server i $\bar{\mu}_j \in R^+ \forall j$ is the nominal service rate value of flow j $\tilde{\mu}_j \in R^+ \forall j$ is a deviation value associated with a service rate value of flow j In addition, control program 200 can determine $\bar{\mu}_j$, $\tilde{\mu}_j$, and $\Gamma_i$ based on initial (e.g., pre-optimization) information and data, such as:

a respective non-optimal control policy is active during a proportion of time $\eta_j(t)$ that $PE_i$ processes flow j (i.e., i=s(j))

state information corresponding to buffer $124_{i,k}$ for each $PE_i$, such as $x_k$; and actual input rates $a_k$ to a buffer $124_{i,k}$, determined by an instance of monitoring program 121.

In step 206, control program 200 identifies an initial set of control policies. In one embodiment, control program 200 identifies an initial set of control policies included within control policies 114 based on various factors and parameter values in addition to utilizing each active instance of PE $122_1$ through PE $122_N$ within distribution system 120 at respective maximum total service rates. For example, control program 200 identifies a set of control policy respectively applied among utilized PEs of PE $122_1$ through PE $122_N$ that dictates the time fraction during a give duration or temporal interval "T" that PE $122_1$ allocates for processing each class/priority value of a flow of a resource, a maximum service rate for a class/priority value, and further dictates that the sum of the time fractions=1 for each utilized PE.

In other embodiments, if control program 200 cannot identify an initial set of control policies within control policies 114, then control program 200 utilizes "robust" optimization methods to generate an initial set of control policies. "Robust" optimizations techniques generate a set of control policies for distribution system 120 based on a worst-case objective or goal, independent of the constraints associated with processing a set of resources.

In step 208, control program 200 performs an initial optimization. In an embodiment, control program 200 performs an initial optimization for the identified initial set of control policies by determining a set of flow constraints and modifying one or more control values respectively associated with one or more control policies of the identifies set of control policies.

For example, control program 200 optimizes initial set of control policies utilizing the following equations associated with reformulating control policies and flow constraints:

$u_j(t) = \eta_j(t) (\bar{\mu}_j - \tilde{\mu}_j \zeta_j(t)) \forall j$ where $u_j$ is a control variable for flow j at T=0

$\int_0^t G \eta_j(s) (\bar{\mu}_j - \tilde{\mu}_j \zeta_j(s)) ds + x(t) = \alpha + \int_0^t a(s) ds$ (e.g., flow constraints based on information included within matrix G)

In some embodiments, if control program 200 cannot solve the reformulated control policy equations for one or more variables, then control program 200 reverts to optimizing the initial set of control program utilizing robust optimization techniques.

In step 210, control program 200 distributes a set of control policies. Control program 200 distributes a set of control policies to distribution system 120 utilizing network 140. In one embodiment, control program 200 distributes a set of control policies to distribution system 120 based on an initial optimization. In another embodiment, control program 200 distributes a set of control policies generated by control policy program 300 to distribution system 120.

In one scenario, control program 200 directly distributes a set of control policies among the respective elements (e.g., PE $122_1$ through PE $122_N$ and/or interconnect structure 126) of distribution system 120 utilized to process one or more resources of the set of resources. In another scenario, control program 200 transmits a set of control policies to an aspect of distribution system 120 that distributes a set of control policies among respective elements of distribution system 120, such as a SMF or a management system (not shown).

In step 212, control program 200 processes a resource utilizing the distribution system. In various embodiments, control program 200 process a set of resources by instructing a SMF of distribution system 120 or computer systems (not shown) associated with respective elements of distribution system 120 to process a set of resources within distribution system 120 and input to distribution system 120 by executing the distributed set of control policies.

In decision step 213, control program 200 determines whether time=1 . . . M. In another embodiment, control program 200 determines that time=1 M (i.e., M=maximum duration for processing a set of resources by distribution system 120) and proceeds to execute step 214. In other embodiments, if control program 200 determines that no additional resources are to be input to distribution system 120 and each buffer $124_{i,k}$ is empty before time M, then control program 200 terminates for the current request to process resources.

Responsive to determining that time=1 . . . M (yes branch, decision step 213), control program 200 monitors the distribution system (step 214)).

In step 214, control program 200 monitors the distribution system. In an embodiment, control program 200 utilizes monitoring program 129 and/or instances of monitoring program 121 to monitor aspects of distribution system 120, such as input rates of a resource, state data corresponding to buffers $124_k$, an input rate corresponding to a flow j, identifying potential PE or buffer over-capacity conditions, etc. Control program 200 may dictate the frequency that monitoring program 129 and instances of monitoring program 121 obtain data and information related to aspects of distribution system 120 and/or a one or more resources based on rules and dictates included within control policies 114. For example, control program 200 dictates that the frequency of monitoring (e.g., determining) input rates to a buffer is equal to or greater than the frequency that state data associated with one or more buffer is determined.

In some embodiments, control program 200 also redetermines a value corresponding to one or more variables and/or other factors based on monitoring data obtained during one or more temporal intervals prior to interfacing with control policy program 300. For example, control program 200 redetermines the values for $\bar{\mu}_j$, $\underline{\mu}_j$, and $\Gamma_i$ based on monitoring data, such:
- a respective non-optimal control policy is active during a proportion of time $\eta_j(t)$ that $PE_i$ processes flow j (i.e., i=s(j));
- state information corresponding to buffers $124_k=x_k(t_m)$ $\forall k$, m=1, ..., M; and where m=1, ..., M is a set of discrete points during resource processing duration (i.e., time interval) [0,T] when snapshots of state information corresponding to buffer $124_k$ of a PE at each of discreet $t_m$ are determined;
- actual input rates respective buffer $124_k=a_k(t_l)\forall k$, l=1, ..., L; L≥M; and $\forall m \exists l$: $t_{m-1}<t_l<t_m$.

In addition, control program 200 reviews distribution system information 112 to determine whether a change as occurred to one or more elements of distribution system 120 prior to interfacing with control policy program 300.

In various embodiments, control program 200 interfaces with control policy program 300 to optimize the control policies utilized by distribution system 120 to process a set of resources. In response, control program 200 receives a set of further optimized control policies to apply to distribution system 120 to process a set of resources.

Referring to decision step 213, responsive to determining that time T does not equal a time interval from 1 through M (i.e., T>M) (No branch, decision step 213), control program 200 terminates. In some scenarios, control program 200 terminates and instructs distribution system 120 to suspend processing the set of resources potentially leaving unprocessed resources among the plurality of buffer 124's included among $PE 122_1$ through $PE 122_N$. Control program 200 may instruct distribution system 120 and/or instances of monitoring program 121 to determine whether residual amounts of one or more resources that remain among plurality of buffer 124's within distribution system 120 and update variables 115 with the determined residual resource within a given instance of buffer $124_{i,k}$.

FIG. 3 is a flowchart depicting the operational steps of control policy program 300, a program that reformulates (e.g., optimizes) a set of control policies associated with distribution system that receives and redistributes a resource, in accordance with embodiments of the present invention. In an embodiment, control policy program 300 interfaces with control program 200 optimize a distribution system that receives and redistributes (e.g., processes) a set of resources based on monitoring data obtained while processing the set of resources. In various embodiments, control policy program 300 can execute one or more steps for each control policy applied to elements of distribution system 120 for a given temporal interval "T".

In step 302, control policy program 300 selects a control policy. In one embodiment, control policy program 300 selects a control policy from among the control policies that are applied to the elements of distribution system 120 to process a set of resources. For example, if control policy program 300 determines that the configuration of distribution system 120 and the assignments of flows 127 do not change, then control policy program 300 can optimize PEs individually. In some embodiments, control policy program 300 selects a copy of the current set of control policies for optimization. In another embodiment, if control policy program 300 determines that distribution system 120 is service rate limited or buffer storage capacity constrained based on an increased input rate of one or more resources, then control program 300 selects or copies a quantity of control policies within control policies 114 equal to the number of additional PEs to activate within distribution system 120 to solution a goal in addition to selecting one or more current control policies.

In step 304, control policy program 300 approximates a continuous function for a variable. In one embodiment, control policy program 300 approximate a continuous function for $a_n(t)$ and $x_n(t)$ using splines and values corresponding to $a_{k,n}(t_l)$ and $x_{k,n}(t_m)$. For example, control policy program 300 utilizes data interpolation based on the discreet observation time values (i.e., $t_l$ and $t_m$) and the corresponding values determined by a monitoring program to determines a set of splines that approximate a continuous function associated with a variable.

In another embodiment, control policy program 300 approximates a continuous function for one or more variables based on other applicable techniques, such a regression analysis, kernel functions, curve fitting, time-series modeling etc.

In step 306, control policy program 300 determines information corresponding to a buffer. In one embodiment, control policy program 300 receives information corresponding to a buffer from an instance of monitoring program 121 triggered at dictated temporal intervals.

In step 308, control policy program 300 updates an estimate associated with a parameter. For example, control policy program can estimate a quantity of resource within a buffer of a PE by solving one of the equations below based on various factors, such an effort available from a PE and a respectively service rate. In one example, control policy program 300 determines the quantity of resource remain in a buffer (i.e., $\delta_n(t)$) at any instance within temporal range [0,T] utilizing a equation: $G_n^{-1}(\alpha_n+\int_0^t a_n(s)ds-x_n(t))$ and the at any intermediate temporal instance (t) by utilizing the approximated continuous functions respectively associated with at least $a_n(t)$ and $x_n(t)$.

Alternatively, control policy program 300 can update an estimate associated the amount of resource that remains in a buffer can be calculated utilizing PE effort values and service rate values associated with flow j at any instance within temporal range [0,T] by solving:

$\delta_{n,j}(t)=\bar{\mu}_{n,j}\int_0^t \eta j(s)ds-\underline{\mu}_{n,j}\int_0^t \eta j(s)\zeta_j(s)ds$; for all t: $\delta_{n,j}(t)>0$, $\eta_j(t)>0$; and calculating values $$\bar{\mu}_j = \min_{t,n}\frac{\delta_{n,j}(t)}{\int_0^t \eta_j(s)ds} \text{ and } \underline{\mu}_j = \bar{\mu}_j - \max_{t,n}\frac{\delta_{n,j}(t)}{\int_0^t \eta_j(s)ds}$$

In some embodiments, control policy program 300 updates an estimate associated with a parameter based on information received from monitoring program 129 and/or instance of monitoring program 121 and various equations discussed in step 204 of control program 200.

In step 310, control policy program generates another set of control policies. Control policy program 300 stores one or more generated sets of control policies and associated information, such as configuration information for distribution system 120, state data associated with one or more elements distribution system 120, control values, a cost of a respective flow j, a cost to store a resource within a buffer, a continuous function for a variable, constraints, optimization goals, etc., of within control policies 114 for future reference and/or use. In addition, control policy program 300 notifies (e.g., messages) control program 200 that another set of control policies is available to improve the optimization of distribution system 120 based a current state of the resource received via instances of input 132.

In an embodiment, control policy program 300 generates an optimized set of control policies by solving reformulated control policy formulas such as:

$u_j(t) = \eta_j(t)(\bar{\mu}_j - \tilde{\mu}_j \zeta_j(t)) \forall j$ and/or adjusting flow constraint based on $\int_0^t G\eta_j(s)(\bar{\mu}_j - \tilde{\mu}_j \zeta_j(s))ds + x(t) = \alpha + \int_0^t a(s)ds$ utilizing items defined within step 202 of control program 200.

In some embodiments, control policy program 300 calculated other items that indicate the effect optimizing a set of control programs, such as PE effort summaries for a given set of control policies.

For example, a summary of PE effort is promotional to the sum of resource left in respective buffer via corresponding flow j as determined by:

$\Sigma_{j:s(j)=i} \bar{\mu}_{n,j} \int_0^t \eta j(s) ds - \Sigma_{j:s(j)=i} \tilde{\mu}_{n,j} \int_0^t \eta j(s) \zeta_j(s) ds = \Sigma_{j:s(j)=i} \delta_{n,j}(t);$
and $$\Gamma_i = \max_{t,n} \frac{\Sigma_{j:s(j)=i} \bar{\mu}_{n,j} \int_0^t \eta_j(s) ds - \Sigma_{j:s(j)=i} \delta_{n,j}(t)}{\Sigma_{j:s(j)=i} \bar{\mu}_{n,j} \int_0^t \eta_j(s) ds}$$

If control policy program 300 determines that a change to a set of control parameters shrinks the uncertainty set associated with one or more values, then control program 300 determines that the generated set of control program is more optimized that one or more prior sets of control programs.

Figure 4:
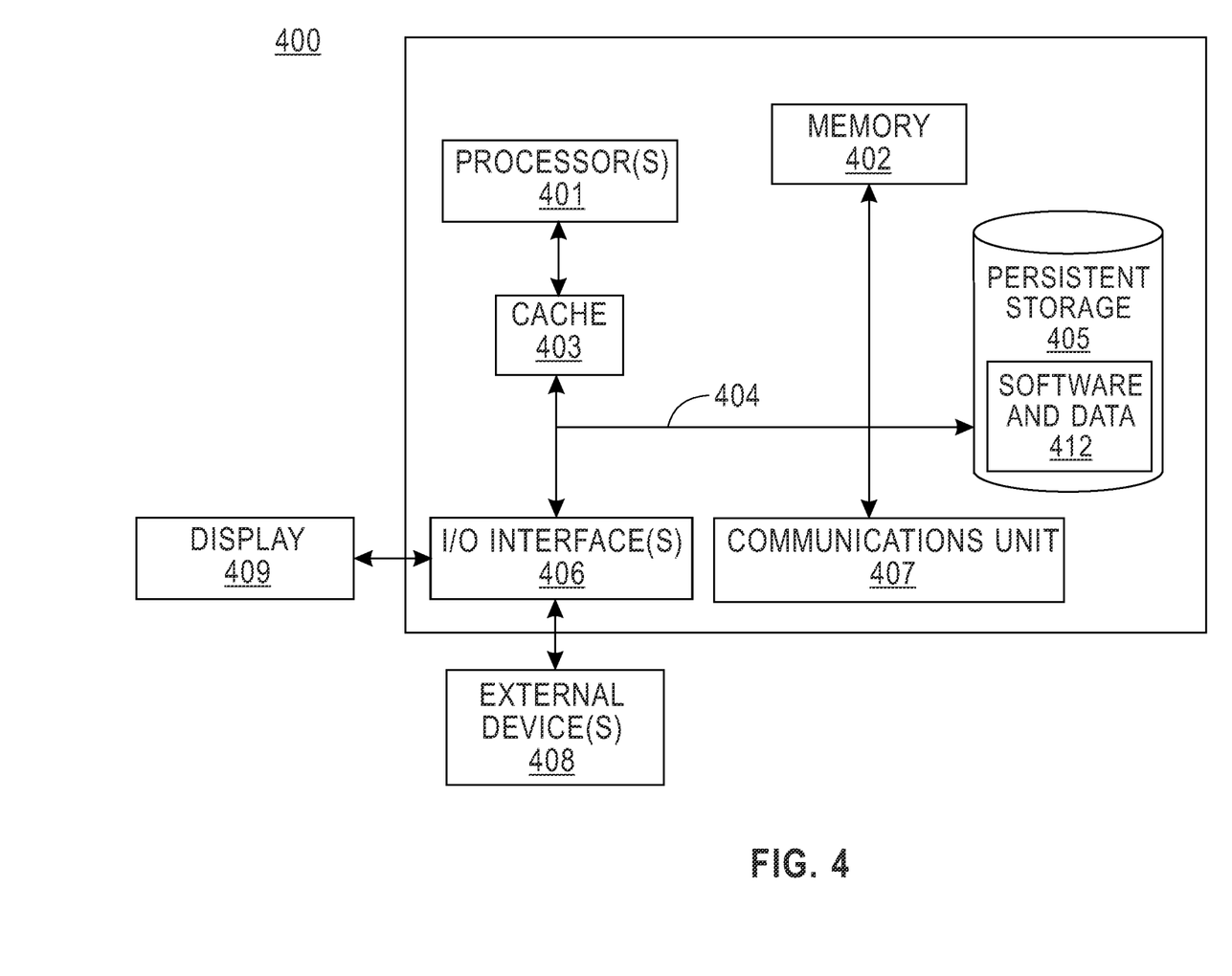
FIG. 4 is a block diagram of components of a computer, according to an embodiment of the present invention.

FIG. 4 depicts computer system 400, which is representative system 110 and one or more elements of distribution system 120, such as PE $122_1$ through PE $122_N$. In some embodiments, computer system 400 is representative of one or more computer systems (not shown) that control one or more elements of distribution system 120, such as PE $122_1$ through PE $122_N$ and interconnect structure 126. Computer system 400 is an example of a system that includes software and data 412. Computer system 400 includes processor(s) 401, cache 403, memory 402, persistent storage 405, communications unit 407, input/output (I/O) interface(s) 406, and communications fabric 404.

Communications fabric 404 provides communications between memory 402, cache 403, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses, such as a peripheral component interconnects (PCI) bus, or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 110, software and data 412 includes resource information 112, distribution system information 113, control policies 114, variables 115, controls 116, control program 200, control policy program 300, and various programs (not shown).

Communications unit 407, in these examples, provides for communications with other data processing systems or devices, including resources of system 110 and distribution system 120. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computing system, such as an instance of node 10. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data 412 used to practice embodiments of the present invention can be stored on such portable computer readable storage media and can be loaded onto persistent storage 405 via I/O interface(s) 406. I/O interface(s) 406 also connect to display 409.

I/O interface(s) 406 also allows one or more devices to interact with computer system/server 400; and/or any devices (e.g., network card, modem, etc.) that enable computer system/server 400 to communicate with one or more other computing devices. Such communication can occur via I/O interface(s) 406. Still yet, computer system/server 400 can communicate with one or more networks, such as a local area network (LAN), a general wide area network (WAN), and/or a public network (e.g., the Internet) via communications unit 407. It should be understood that although not shown, other hardware and/or software components could be used in conjunction with computer system/server 400. Examples include, but are not limited to: microcode, device drivers, redundant processing units, external disk drive arrays, RAID systems, tape drives, and data archival storage systems, etc.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, information associated with a configuration of a distribution system;
   determining, by one or more computer processors, information related to a set of resource to process utilizing the distribution system;
   determining, by one or more computer processors, respective values for a plurality of parameters related to processing the set of resources based on an initial value of a first parameter and an estimated initial value of a second, changeable parameter that corresponds to a set of uncertainty values utilizing the distribution system;
   selecting, by one or more computer processors, an initial set of control policies;
   updating, by one or more computer processors, the initial set of control policies; and
   instructing, by one or more computer processors, the distribution system to process the set of resources utilizing the updated set of control policies.

2. The computer-implemented method of claim 1, wherein the distribution system includes a plurality of process elements (PEs) and an interconnect structure.

3. The computer-implemented method of claim 1, wherein the information associated with the configuration of the distribution system includes information selected from the group consisting of a quantity of active PEs, a quantity of buffers included within a respective PE, a storage capacity corresponding to a respective buffer, an ID corresponding to each active PE, and IDs respectively associated with the one or more buffers included within an active PE.

4. The computer-implemented method of claim 3, wherein information associated with the configuration of the distribution system further includes one or more items of information related to an interconnect structure included in the distribution system selected from the group consisting of IDs corresponding to a plurality of flows, a direction corresponding to a respective flow, a maximum capacity for the respective flow, IDs of elements linked by the respective flow, and an action related to the respective flow; wherein the action related to the respective flow is selected from the group consisting of receiving an allocation of a respective resource via an input, outputting processed resource distributed among one or more destinations, and transferring a portion of the respective resource between two PEs.

5. The computer-implemented method of claim 1, further comprising:
   determining, by one or more computer processors, state data respectively associated with a PE of the active PEs within the distribution system, wherein state data includes a maximum total service rate related to processing one or more resources, a service rate based on a class value assigned to a respective resource, and an initial quantity of a resource within a respective buffer of the PE.

6. The computer-implemented method of claim 1, wherein determining respective values for the plurality of parameters further comprises:
   determining, by one or more computer processors, an initial value corresponding to a first parameter;
   determining, by one or more computer processors, that a second parameter is a changeable parameter; and
   responsive to determining that the second parameter is a changeable parameter, determining, by one or more computer processors, an estimated initial value corresponding to the second parameter.

7. The computer-implemented method of claim 6, wherein determining an estimated initial value corresponding to the second parameter further comprises:
   determining, by one or more computer processors, an uncertainty set of values corresponding to the second parameter based on state data corresponding to one or more buffers, a nominal service rate corresponding to a flow of a respective resource, and an initial proportion of time value assigned to class value associated with a respective resource; and
   selecting, by one or more computer processors, a value for the second parameter from among the uncertainty set of values based, at least in part, on a goal related to processing the set of resources utilizing the distribution system.

8. A computer program product comprising:
   one or more computer readable storage media and program instructions stored on the one or more computer readable storage media, the program instructions readable/executable by one or more computer processors:
   program instructions to determine information associated with a configuration of a distribution system;
   program instructions to determine information related to a set of resource to process utilizing the distribution system;
   program instructions to determine respective values for a plurality of parameters related to processing the set of resources based on an initial value of a first parameter and an estimated initial value of a second, changeable parameter that corresponds to a set of uncertainty values utilizing the distribution system;
   program instructions to select an initial set of control policies;
   program instructions to update the initial set of control policies; and program instructions to instruct the distribution system to process the set of resources utilizing the updated set of control policies.

9. The computer program product of claim 8, wherein the distribution system includes a plurality of process elements (PEs) and an interconnect structure.

10. The computer program product of claim 8, wherein the information associated with the configuration of the distribution system includes information selected from the group consisting of a quantity of active PEs, a quantity of buffers included within a respective PE, a storage capacity corresponding to a respective buffer, an ID corresponding to each active PE, and IDs respectively associated with the one or more buffers included within an active PE.

11. The computer program product of claim 10, wherein information associated with the configuration of the distribution system further includes one or more items of information related to an interconnect structure included in the distribution system selected from the group consisting of IDs corresponding to a plurality of flows, a direction corresponding to a respective flow, a maximum capacity for the respective flow, IDs of elements linked by the respective flow, and an action related to the respective flow; wherein the action related to the respective flow is selected from the group consisting of receiving an allocation of a respective resource via an input, outputting processed resource distributed among one or more destinations, and transferring a portion of the respective resource between two PEs.

12. The computer program product of claim 8, further comprising:
program instructions to determine state data respectively associated with a PE of the active PEs within the distribution system, wherein state data includes a maximum total service rate related to processing one or more resources, a service rate based on a class value assigned to a respective resource, and an initial quantity of a resource within a respective buffer of the PE.

13. The computer program product of claim 8, wherein program instructions to determine respective values for the plurality of parameters further comprise:
program instructions to determine an initial value corresponding to a first parameter;
program instructions to determine that a second parameter is a changeable parameter; and
responsive to determining that the second parameter is a changeable parameter, program instructions to determine an estimated initial value corresponding to the second parameter.

14. The computer program product of claim 13, wherein program instructions to estimate the initial value corresponding to the second parameter further comprise:
program instructions to determine an uncertainty set of values corresponding to the second parameter based on state data corresponding to one or more buffers, a nominal service rate corresponding to a flow of a respective resource, and an initial proportion of time value assigned to class value associated with a respective resource; and
program instructions to select a value for the second parameter from among the uncertainty set of values based, at least in part, on a goal related to processing the set of resources utilizing the distribution system.

15. A computer system comprising:
one or more computer processors;
one or more computer readable storage media; and
program instructions stored on the computer readable storage media for execution by at least one of the one or more computer processors, the program instructions comprising:
program instructions to determine information associated with a configuration of a distribution system;
program instructions to determine information related to a set of resource to process utilizing the distribution system;
program instructions to determine respective values for a plurality of parameters related to processing the set of resources based on an initial value of a first parameter and an estimated initial value of a second, changeable parameter that corresponds to a set of uncertainty values utilizing the distribution system;
program instructions to select an initial set of control policies;
program instructions to update the initial set of control policies; and
program instructions to instruct the distribution system to process the set of resources utilizing the updated set of control policies.

16. The computer system of claim 15, wherein the distribution system includes a plurality of process elements (PEs) and an interconnect structure.

17. The computer system of claim 15, wherein the information associated with the configuration of the distribution system includes information selected from the group consisting of a quantity of active PEs, a quantity of buffers included within a respective PE, a storage capacity corresponding to a respective buffer, an ID corresponding to each active PE, and IDs respectively associated with the one or more buffers included within an active PE.

18. The computer program product of claim 17, wherein information associated with the configuration of the distribution system further includes one or more items of information related to an interconnect structure included in the distribution system selected from the group consisting of IDs corresponding to a plurality of flows, a direction corresponding to a respective flow, a maximum capacity for the respective flow, IDs of elements linked by the respective flow, and an action related to the respective flow; wherein the action related to the respective flow is selected from the group consisting of receiving an allocation of a respective resource via an input, outputting processed resource distributed among one or more destinations, and transferring a portion of the respective resource between two PEs.

19. The computer system of claim 15, further comprising:
program instructions to determine state data respectively associated with a PE of the active PEs within the distribution system, wherein state data includes a maximum total service rate related to processing one or more resources, a service rate based on a class value assigned to a respective resource, and an initial quantity of a resource within a respective buffer of the PE.

20. The computer system of claim 15, wherein program instructions to determine respective values for the plurality of parameters further comprise:
program instructions to determine an initial value corresponding to a first parameter;
program instructions to determine that a second parameter is a changeable parameter; and
responsive to determining that the second parameter is a changeable parameter, program instructions to determine an estimated initial value corresponding to the second parameter.

* * * * *